United States Patent
Maekawa et al.

(10) Patent No.: US 10,871,115 B2
(45) Date of Patent: Dec. 22, 2020

(54) METHOD FOR CONTROLLING INTERNAL COMBUSTION ENGINE AND DEVICE FOR CONTROLLING SAME

(71) Applicant: NISSAN MOTOR CO., LTD., Yokohama (JP)

(72) Inventors: Atsushi Maekawa, Kanagawa (JP); Kenji Suzuki, Kanagawa (JP); Kentaro Yamano, Kanagawa (JP); Takeshi Miyamoto, Kanagawa (JP); Tomoki Itou, Kanagawa (JP); Taichi Andou, Kanagawa (JP); Toshio Hashimoto, Kanagawa (JP); Akio Ashikaga, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/631,282

(22) PCT Filed: Jul. 19, 2017

(86) PCT No.: PCT/JP2017/026011
§ 371 (c)(1),
(2) Date: Jan. 15, 2020

(87) PCT Pub. No.: WO2019/016876
PCT Pub. Date: Jan. 24, 2019

(65) Prior Publication Data
US 2020/0208584 A1    Jul. 2, 2020

(51) Int. Cl.
*F01N 3/00* (2006.01)
*F02D 41/02* (2006.01)
(Continued)

(52) U.S. Cl.
CPC .......... *F02D 41/0255* (2013.01); *F02D 9/02* (2013.01); *F02D 41/0002* (2013.01);
(Continued)

(58) Field of Classification Search
CPC ...... F02D 9/02; F02D 41/068; F02D 41/0255; F02D 41/0002
(Continued)

(56) References Cited

U.S. PATENT DOCUMENTS

| 2002/0095932 A1* | 7/2002 | Izumiura | F02D 11/105 60/285 |
| 2004/0045346 A1* | 3/2004 | Arai | G01F 1/6965 73/114.34 |

(Continued)

FOREIGN PATENT DOCUMENTS

| JP | 2000-345910 A | 12/2000 |
| JP | 2002-188500 A | 7/2002 |

(Continued)

*Primary Examiner* — Jason D Shanske
(74) *Attorney, Agent, or Firm* — Faegre Drinker Biddle & Reath LLP

(57) ABSTRACT

When atmospheric pressure (Pa) which varies according to altitude is higher than a predetermined pressure threshold (Path) during idle operation in which catalyst warm-up request is issued, an intake pressure is controlled, through a throttle valve (19), to an intake pressure at which an intake air amount required to promote the warm-up of a catalyst converter (26) is obtained. When the atmospheric pressure (Pa) is lower than the predetermined pressure threshold (Path), the intake pressure is controlled, through a throttle valve (19), to an intake pressure (Pa–Pb) at which a differential pressure (Pb) required by a brake booster (8) is obtained. Accordingly, negative pressure in the brake booster (8) can be secured while promoting the warm-up of the catalyst during the idle operation.

5 Claims, 4 Drawing Sheets

(51) Int. Cl.
    *F02D 9/02*      (2006.01)
    *F02D 41/00*     (2006.01)
    *F02D 41/06*     (2006.01)
    *F02P 5/15*      (2006.01)

(52) U.S. Cl.
    CPC .......... *F02D 41/068* (2013.01); *F02P 5/1508* (2013.01); *F02D 2009/0227* (2013.01); *F02D 2200/0406* (2013.01)

(58) Field of Classification Search
    USPC .......................................................... 60/285
    See application file for complete search history.

(56) References Cited

U.S. PATENT DOCUMENTS

| | | | | |
|---|---|---|---|---|
| 2004/0159095 A1* | 8/2004 | Grieser | ................. | F02D 41/064 |
| | | | | 60/284 |
| 2009/0018754 A1* | 1/2009 | Hano | .................... | F01L 1/3442 |
| | | | | 701/103 |
| 2013/0253801 A1* | 9/2013 | Pursifull | ............. | F02D 41/0002 |
| | | | | 701/103 |
| 2014/0311446 A1* | 10/2014 | Whitney | ............... | F02D 41/005 |
| | | | | 123/344 |
| 2015/0040852 A1* | 2/2015 | Pursifull | ................... | F02D 9/02 |
| | | | | 123/184.56 |
| 2017/0356375 A1* | 12/2017 | Glugla | .............. | B60W 30/1882 |

FOREIGN PATENT DOCUMENTS

| | | |
|---|---|---|
| JP | 2007-32317 A | 2/2007 |
| JP | 2009-299618 A | 12/2009 |

* cited by examiner

METHOD FOR CONTROLLING INTERNAL COMBUSTION ENGINE AND DEVICE FOR CONTROLLING SAME

TECHNICAL FIELD

The present invention relates to a method for controlling an intake pressure on the downstream side of a throttle valve of an internal combustion engine and a device for controlling the same, and particularly to warm-up promotion control for a catalyst converter.

BACKGROUND TECHNOLOGY

In Japanese Patent Application Publication 2002-188500, as a catalyst warm-up promotion control after cold start of an internal combustion engine, at the time of idling, the amount of intake air is increased (an auxiliary air amount is increased or a throttle valve opening degree is increased), and ignition timing retard is carried out. Then, when the differential pressure between the negative pressure in a brake booster and atmospheric pressure becomes lower than a predetermined pressure, the catalyst warm-up promotion control by these increasing amount of the intake air and ignition timing retard is gradually controlled.

However, the invention of Japanese Patent Application Publication 2002-188500 is a control assuming a situation in which the differential pressure between the negative pressure in the brake booster and the atmospheric pressure becomes gradually small during the execution of the catalyst warm-up promotion control, and in case where the internal combustion engine is started at high altitudes where the atmospheric pressure is low, the negative pressure of the brake booster cannot be quickly secured. In addition, under a constant atmospheric pressure, the control is executed such that when shortage in the negative pressure of the brake booster occurs, the amount of the intake air is reduced and when the negative pressure in the brake booster is recovered, the amount of the intake air is increased, thereby becoming a factor in rotation speed variation.

SUMMARY OF THE INVENTION

In an internal combustion engine including a catalyst converter for purifying exhaust gas and a brake booster to which negative pressure is supplied from a downstream of a throttle valve, at a time of an idle operation in which warm-up of the catalyst converter needs to be promoted, the present invention controls an intake pressure to an intake pressure at which an intake air amount required to promote the warm-up of the catalyst converter is obtained, when the atmospheric pressure is higher than a predetermined pressure threshold, and controls the intake pressure to an intake pressure at which a differential pressure required by the brake booster is obtained, when the atmospheric pressure is lower than the pressure threshold.

Accordingly, when the atmospheric pressure which varies according to altitude is higher than the predetermined pressure threshold, by largely increasing the intake air amount, the early warm-up of the catalyst converter can be achieved, and when the atmospheric pressure is lower than the predetermined pressure threshold, the negative pressure required by the brake booster can be secured immediately after engine start.

MODE FOR IMPLEMENTING THE INVENTION

In the following, one embodiment of the present invention will be explained in detail based on the drawings.

Figure 1:
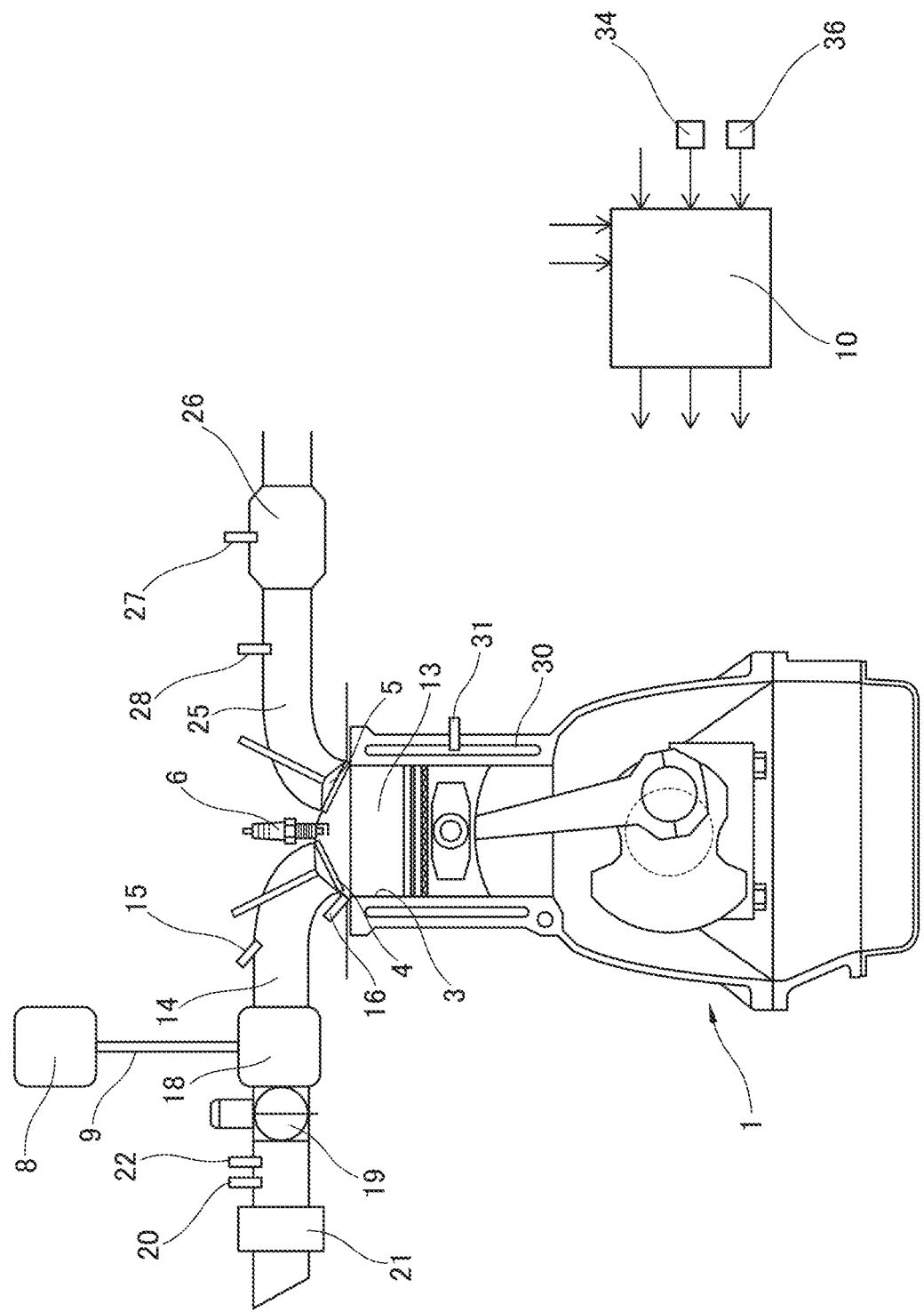
FIG. 1 is a schematic illustrative view showing a system configuration of an internal combustion engine according to the present invention.

FIG. 1 shows the system configuration of an internal combustion engine 1 for a vehicle to which the present invention is applied. This internal combustion engine 1 of the embodiment is a so-called four stroke cycle spark ignition type internal combustion engine with natural intake, and a pair of intake valves 4 and a pair of exhaust valves 5 are disposed on the ceiling wall surface of each cylinder 3, and an ignition plug 6 is disposed in the middle part surrounded by these intake valves 4 and exhaust valves 5.

In each cylinder, a fuel injection valve 15 for port injection is disposed in an intake passage 14 connected to a combustion chamber 13 via intake valves 4. In addition, a fuel injection valve 16 for cylinder injection is provided to directly injection fuel into cylinder 3. That is, the embodiment shown in the drawing is a so-called dual injection type fuel injection system, and by properly using port injection fuel injection valve 15 and cylinder injection fuel injection valve 16 according to a load and the like, fuel supply is carried out. An electronic control type throttle valve 19, the opening degree of which is controlled based on a control signal from an engine controller 10, is interposed more on the upstream side than an intake collector 18 of intake passage 14. An air cleaner 21 is disposed on the upstream side of throttle valve 19. An air flow meter 20 for detecting an intake air amount and an atmospheric pressure sensor 22 for detecting atmospheric pressure are disposed between throttle valve 19 and air cleaner 21.

In addition, a braking system of the vehicle on which internal combustion engine 1 is mounted is equipped with a negative pressure type brake booster 8. A negative pressure as an operation source is supplied to this brake booster 8 from intake collector 18 via a negative pressure pipe 9. In addition, negative pressure pipe 9 is equipped with a check valve which is not shown in the drawing.

A catalyst converter 26 formed by a three-way catalyst is disposed on an exhaust passage 25 connected to combustion chamber 13 via exhaust valves 5. In addition, although, for example, catalyst converter 26 is configured by including a pre-catalyst converter disposed on the relatively upstream and a main catalyst converter disposed under the floor of the vehicle, in FIG. 1, it is shown as a single one by being simplified. An air-fuel ratio sensor 28 for detecting an air-fuel ratio is disposed between exhaust valves 5 and catalyst converter 26. A catalyst temperature sensor 27 for detecting the catalyst temperature of catalyst converter 26 is disposed to catalyst converter 26. In addition, an exhaust temperature sensor for detecting an exhaust temperature may be provided to the inlet of catalyst converter 26 to estimate the catalyst temperature of catalyst converter 26 from the detected exhaust temperature.

In addition, a water temperature sensor 31 for detecting a cooling water temperature representing the temperature of internal combustion engine 1 is provided to a water jacket 30 surrounding cylinders 3 of internal combustion engine 1.

In addition to detection signals of air flow meter 20, atmospheric pressure sensor 22, catalyst temperature sensor 27, air-fuel ratio sensor 28 and temperature sensor 31, detection signals of sensors, such as a crank angle sensor 34 for detecting engine speed and an accelerator opening degree sensor 36 for detecting the depression amount of an accelerator pedal operated by a driver, are input to engine controller 10. Engine controller 10 is configured to optimally control the fuel injection amount and the fuel injection timing of fuel injection valves 15 and 16, the ignition timing of ignition plug 6 and the opening degree of throttle valve 19, based on the detection signals.

Figure 2:
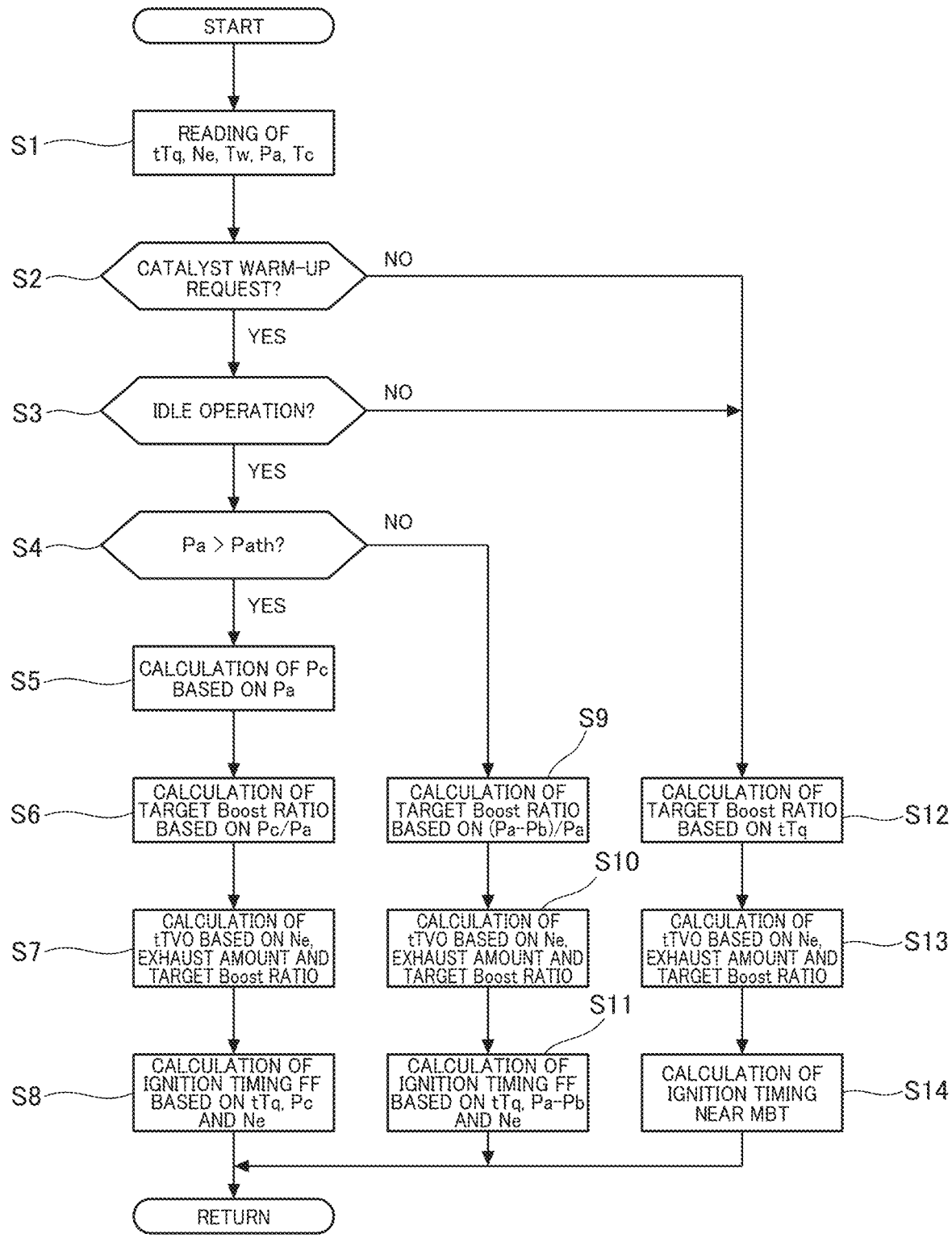
FIG. 2 is a flowchart showing the flow of the control at the time of catalyst warm-up operation.

In the following, based on the flowchart of FIG. 2, a catalyst warm-up promotion control executed by engine controller 10 to activate catalyst converter 26 in an early stage at the time of the cold start of internal combustion engine 1 will be specifically explained. In addition, the routine shown in this flowchart is repeatedly executed at appropriate intervals (for example, very short time intervals)

In a step 1, (in FIG. 2, it is shown as S1), various parameters necessary for the control are read. For example, a target torque tTq of internal combustion engine 1, an engine speed Ne, a cooling water temperature Tw, an atmospheric pressure Pa and a catalyst temperature Tc are read. Next, in a step 2, based on cooling water temperature Tw and catalyst temperature Tc, it is determined whether or not catalyst warm-up is requested. When the catalyst warm-up is not requested, the process proceeds from step 2 to the after-mentioned step 12.

When the catalyst warm-up request is issued, the process proceeds from step 2 to a step 3, and it is determined whether or not the operation is during idle operation. For example, when the vehicle stops, the depression amount of the accelerator pedal detected by accelerator opening degree sensor 36 is substantially 0, and the gear shift position of an transmission is at a neutral position, the operation is determined as an idling operation state. If the operation is not in the idling operation state, the process proceeds from step 3 to the after-mentioned step 12.

When it is determined that the operation is during the idle operation in step 3, the process proceeds to a step 4. In step 4, atmospheric pressure Pa at that time is compared with a predetermined pressure threshold Path. When atmospheric pressure Pa is higher than predetermined pressure threshold Path, the process proceeds from step 4 to a step 5. In step 5, as a target intake pressure (the pressure inside intake collector 18), an intake pressure Pc at which an intake air amount required to promote the warm-up of catalyst converter 26 is obtained is calculated based on atmospheric pressure Pa at that time. The value of intake pressure Pc at which an intake air amount required to promote the warm-up of catalyst converter 26 is obtained is previously given as a table with, for example, atmospheric pressure Pa as a parameter.

The process proceeds from step 5 to a step 6, and in this step 6, a target Boost ratio is calculated as "Pc/Pa" from atmospheric pressure Pa and target intake pressure Pc. The Boost ratio is a ratio of the atmospheric pressure (atmospheric pressure at that time) and the intake pressure inside intake collector 18. The target Boost ratio is a Boost ratio to be achieved by controlling the opening degree of throttle valve 19.

The process proceeds from step 6 to a step 7, and in this step 7, a target opening degree tTVO of throttle valve 19 is calculated based on the target Boost ratio, engine speed Ne and the effective exhaust amount of cylinder 3. The effective exhaust amount of cylinder 3 is the substantial exhaust amount of cylinder 3 in consideration of fulling efficiency by valve timing and the like. That is, the intake pressure inside intake collector 18 is determined by the air amount flowing out from intake collector 18 (that is, the air amount taken into cylinder 3) per unit time and the air amount flowing into the inside of intake collector 18 through throttle valve 19 per unit time. The air amount flowing out from intake collector 18 and the air amount flowing into the inside of intake collector 18 through throttle valve 19 can be calculated by using Bernoulli's expression, and target opening degree tTVO of throttle valve 19 which is required to realize the target Boost ratio (Pc/Pa) is therefore determined. In addition, target opening degree tTVO at that time is set to an opening degree larger than the opening degree of throttle valve 19 during the idle operation at the time when the catalyst warm-up request is not issued, and an excessive intake air amount required for the catalyst warm-up is given to internal combustion engine 1. Then, the fuel injection amount of fuel injection valves 15 and 16 is basically controlled in proportion to the intake air amount.

Next, the process proceeds from step 7 to a step 8, and in this step 8, an ignition timing (in particular, its feedforward control FF amount) is calculated based on target torque tTq, target intake pressure Pc and engine speed Ne. Specifically, with respect to the above excessive intake air amount and the fuel injection amount, the ignition timing is calculated as an ignition timing which is largely delayed from MBT point, such that generated torque matches with target torque rTq by reducing thermal efficiency.

On the other hand, in step 4, when atmospheric pressure Pa at that time is lower than predetermined pressure threshold Path (when it is equal to or lower than pressure threshold Path in the flowchart), the process proceeds from step 4 to a step 9, and the target Boost ratio is set so as to obtain a differential pressure Pb required by brake booster 8. Specifically, an intake pressure (Pa−Pb), at which differential pressure Pb which is required by brake booster 8 is obtained, with respect to atmospheric pressure Pa at that time is set as a target intake pressure, and based on this, target Boost ratio is set as "(Pa−Pb)/Pa". In addition, intake pressure (Pa−Pb) at which differential pressure Pb required by brake booster 8 is obtained is previously given as a table with, for example, atmospheric pressure Pa as a parameter.

The process proceeds from step 9 to a step 10, similar to the above-mentioned step 7, target opening degree tTVO of throttle valve 19 is calculated based on the target Boost ratio, engine speed Ne and the effective exhaust amount of cylinder 3. Here, target opening degree tTVO is also given which is larger than the opening degree of throttle valve 19 at the time when the catalyst warm-up request is not issued. Then, the process proceeds from step 10 to a step 11, similar to the above-mentioned step 8, the ignition timing (in particular, its feedforward control FF amount) is calculated based on target torque tTq, target intake pressure (Pa−Pb) and engine speed Ne. The ignition timing at this time is also an ignition timing which is delayed from MBT point, and by reducing thermal efficiency, generated torque matches with target torque tTq.

At the time when the catalyst warm-up request is not issued or at the time of non-idle operation, the process proceeds from step 2 or step 3 to step 12. In step 12, based on target torque tTq, the target Boost ratio is calculated. That is, the ratio of the intake pressure required for obtaining target torque tTq under atmospheric pressure Pa at that time and atmospheric pressure Pa at that time becomes the target Boost ratio. The process proceeds from step 12 to a step 13, and similar to steps 7 and 10, target opening degree tTVO of throttle valve 19 is calculated based on the target Boost ratio, engine speed Ne and the effective exhaust amount of cylinder 3. Target opening degree tTVO at this time becomes one appropriate for target torque tTq required by a driver. Then, the process proceeds from step 13 to a step 14, and the ignition timing is calculated. The ignition timing at this time is an ignition timing corresponding to normal operation, and is set to an ignition timing in the vicinity of MBT point.

Figure 3:
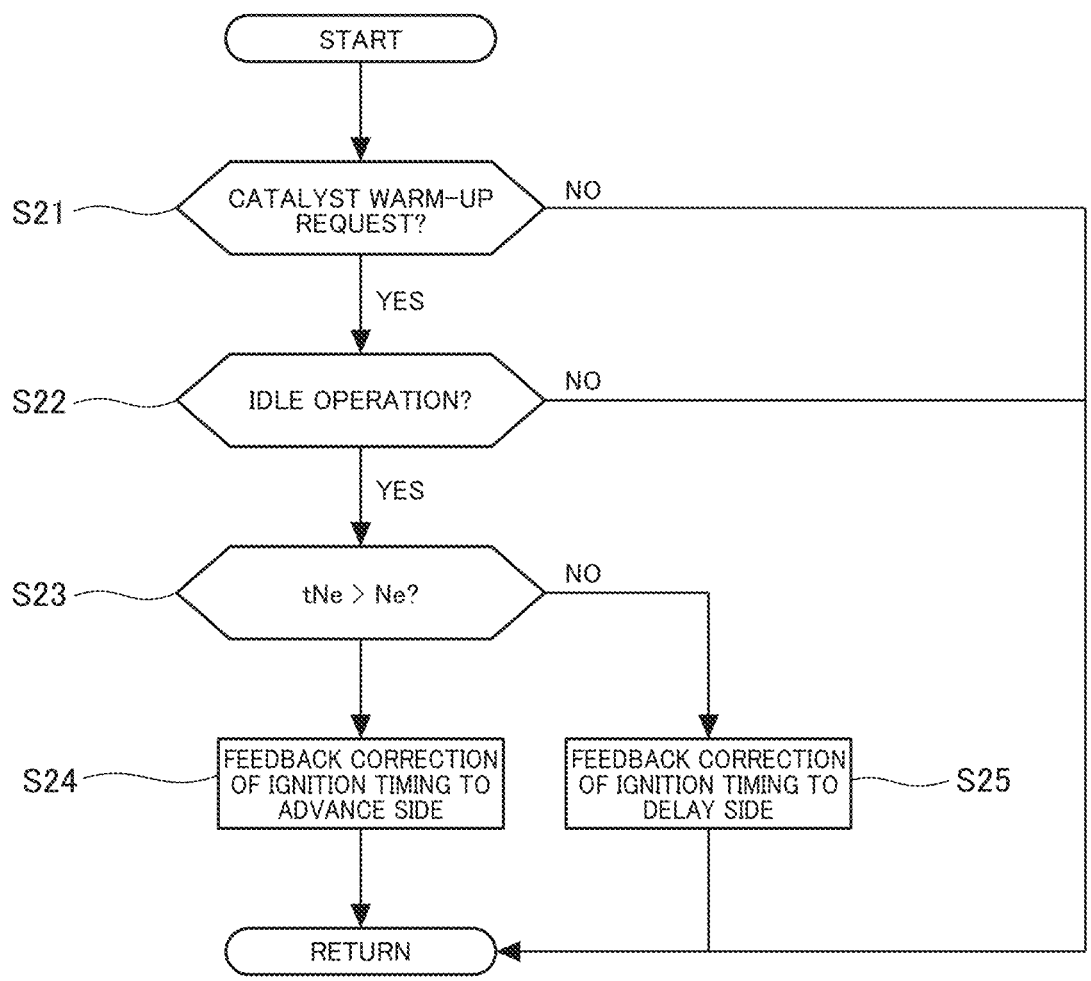
FIG. 3 is a flowchart showing the flow of the control for ignition timing feedback correction.

The flowchart of FIG. 3 shows a feedback control of the ignition timing for controlling an idle speed at the time of the idle operation, corresponding to the catalyst warm-up request. That is, in the catalyst warm-up promotion control shown in the flowchart of FIG. 2, the idle speed control is carried out not by the variable control of the intake air amount but by the ignition timing control. The routine shown in the flowchart is repeatedly executed at appropriate intervals such as very short time intervals. In a step 21, it is determined whether or not the catalyst warm-up request is issued, and in a step 22, it is determined whether or not the operation is during the idle operation. When the catalyst warm-up request is not issued or when the operation is during non-idle operation, the feedback control of the ignition timing for controlling the idle speed is not carried out. In addition, at the time of the idle operation when the catalyst warm-up request is not issued, for example, by the feedback control of the opening degree of throttle valve 19 based on the deviation between a target idle speed and an actual idle speed, the idle speed control is carried out.

When the catalyst warm-up request is issued and the operation is during the idle operation, the process proceeds from step 22 to a step 23, and a target idle speed tNe is compared with an actual engine speed Ne. If target idle speed tNe is higher than actual engine speed Ne at that time, the process proceeds from step 23 to a step 24, and the ignition timing is feedback-corrected to an advance side by, for example, a constant minute amount. By this advance correction, thermal efficiency is improved, and the idle speed rises. If target idle speed tNe is equal to or lower than engine speed Ne at that time, the process proceeds from step 23 to a step 25, the ignition timing is feedback-corrected to an delay side by, for example, a constant minute amount. By this delay correction, thermal efficiency deteriorates, and the idle speed is lowered.

Therefore, a final ignition timing at the time when the catalyst warm-up request is issued and the operation is during the idle operation becomes one in which the feedback amount of steps 24 and 25 is added to the feedforward amount calculated in steps 8 and 11. Consequently, engine speed Ne is maintained at desired target idle speed tNe.

Figure 4:
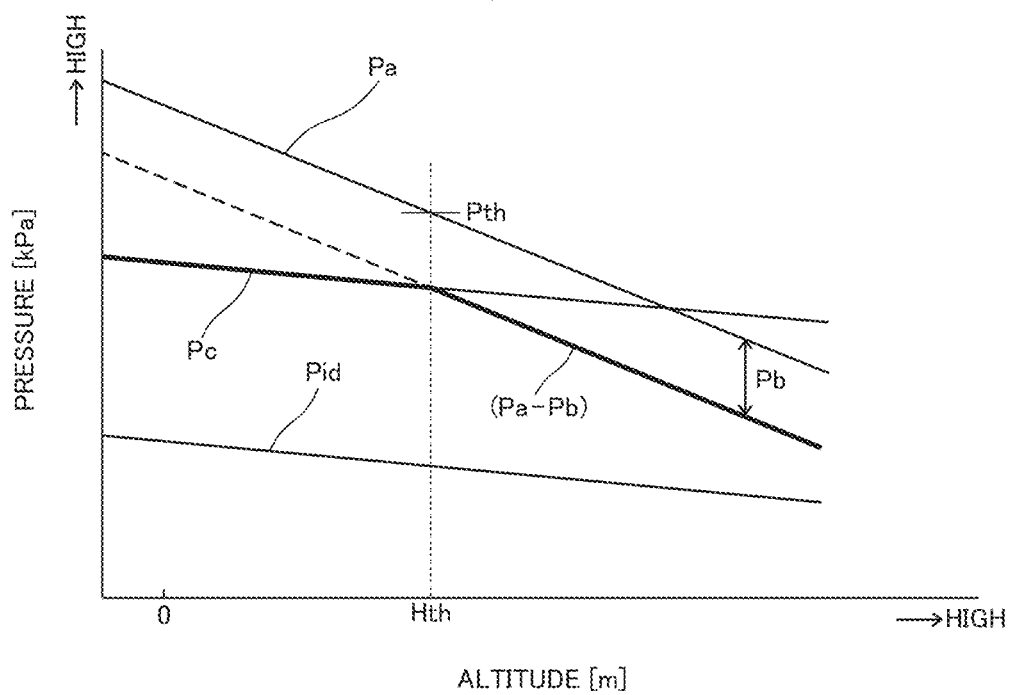
FIG. 4 is a characteristic diagram showing the relation of an intake pressure and the like relative to altitude.

In FIG. 4, altitude is a horizontal axis, and a characteristic of each of atmospheric pressure Pa, intake pressure Pc at which an intake air amount required to promote the warm-up of catalyst converter 26 is obtained, intake pressure (Pa−Pb) at which differential pressure Pb required by brake booster 8 is obtained, and an intake pressure Pid required at the time of the idle operation after completing the catalyst warm-up is shown. As shown in FIG. 4, the higher the altitude becomes, the lower atmospheric pressure Pa becomes. Intake pressure Pid required at the time of the idle operation, specifically, intake pressure Pid required for maintaining a constant idle speed tends to be low as the altitude becomes high, because the lower the atmospheric pressure becomes, the lower pumping loss becomes. However, as compared with the gradient of the lowering of atmospheric pressure Pa, the gradient of the lowing of intake pressure Pid required at the time of the idle operation is mild.

Intake pressure Pc at which an intake air amount required to promote the warm-up of catalyst converter 26 is obtained is set such that the maximum ignition timing retard is carried out within a range not causing the destabilization of combustion. Therefore intake pressure Pc is basically set so as to have a characteristic becoming parallel to the characteristic of intake pressure Pid required at the time of the idle operation, namely, a characteristic in which an amount equivalent to the reduction amount of the thermal efficiency lowered by the ignition timing retard is added to intake pressure Pid required for the idle operation.

Intake pressure (Pa−Pb) at which differential pressure Pb required by brake booster 8 is obtained becomes an intake pressure having a characteristic obtained by subtracting constant differential pressure Pb from atmospheric pressure Pa.

Here, when intake pressure Pc at which an intake air amount required to promote the warm-up of catalyst converter 26 is obtained is compared with intake pressure (Pa−Pb) at which differential pressure Pb required by brake booster 8 is obtained, at a flat land (altitude=0), intake pressure (Pa−Pb) at which differential pressure Pb required by brake booster 8 is obtained is relatively high. In addition, intake pressure Pc and intake pressure (Pa−Pb) match each other at a certain altitude H1 (that is, a certain atmospheric pressure). This means that, on the flat land, if an intake air amount is corrected so as to be increased to the limit of the ignition timing retard so as to sufficiently promote the catalyst warm-up, differential pressure Pb required by brake booster 8 can be secured, but, at a highland higher than the above altitude H1, differential pressure Pb required by brake booster 8 cannot be secured if the intake air amount is corrected so as to be increased to the limit of the ignition timing retard.

Pressure threshold Path in the above embodiment is the value of atmospheric pressure Pa at altitude H1 at which intake pressure Pc at which the intake air amount required to promote the warm-up of catalyst converter 26 is obtained and intake pressure (Pa−Pb) at which differential pressure Pb required by brake booster 8 is obtained match each other.

Therefore, according to the above embodiment, in a lower altitude region than altitude H1, intake pressure Pc at which the intake air pressure require to promote the warm-up of catalyst converter 26 is obtained becomes a target intake pressure, and the opening degree of throttle valve 19 is controlled so as to obtain this target intake pressure Pc. Then, at the same time, the maximum ignition retard is carried out. As mentioned above, the characteristic of target intake pressure Pc at this altitude lower than altitude H1 tends to be lower as atmospheric pressure Pa becomes lower. In contrast to this, in a higher altitude region than altitude H1, intake pressure (Pa−Pb) at which differential pressure Pb required by brake booster 8 is obtained becomes a target intake pressure, and the opening degree of throttle valve 19 is controlled so as to obtain this target intake pressure (Pa−Pb). Then, at the same time, the ignition timing retard is carried out so as to offset an excessive intake air amount and fuel injection amount.

Figure 5:
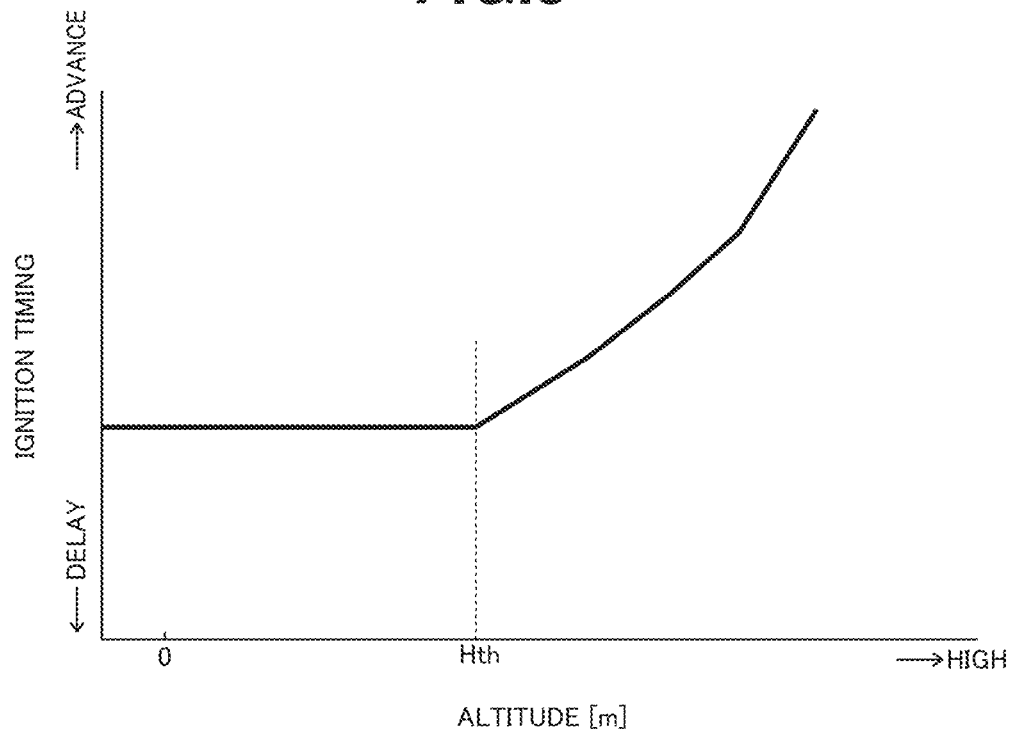
FIG. 5 is a characteristic diagram showing the characteristic of ignition timing retard at the time of the catalyst warm-up operation.

FIG. 5 shows the characteristic of the ignition timing retard with respect to altitude. In FIG. 5, the upper side of a vertical axis is an advance side, and the magnitude of the ignition timing regard added to the ignition timing at the time of the idle operation is shown. As mentioned above, until reaching altitude H1 corresponding to pressure threshold Path, the maximum ignition timing retard which can be realized under the limitation of combustion stability is given. Then, in a higher land than altitude H1, the ignition timing retard gradually becomes small, in correspondence with the reduction of the intake air amount and the fuel injection amount to be added according to altitude.

In this way, in the above embodiment, during the idle operation, when atmospheric pressure Pa which varies in accordance with altitude is higher than predetermined pressure threshold Path, an intake pressure is controlled, through throttle valve 19, to intake pressure Pc at which the intake pressure amount required to promote the warm-up of catalyst converter 26 is obtained, and when atmospheric pressure Pa is lower than predetermined pressure threshold Path, an intake pressure is controlled, through throttle valve 19, to intake pressure (Pa–Pb) at which differential pressure Pb required by brake booster 8 is obtained.

Accordingly, negative pressure in brake booster 8 can be secured while promoting the warm-up of the catalyst during the idle operation. In particular, in the above embodiment, since when atmospheric pressure Pa is lower than predetermined pressure threshold Path, the intake pressure is controlled to the highest intake pressure (Pa–Pb) in a range in which differential pressure Pb required by brake booster 8 is obtained, the maximum catalyst warm-up promotion can be realized even under a condition in which atmospheric pressure Pa is low. In addition, since a proper control according to altitude (atmospheric pressure Pa) is carried out immediately after starting internal combustion engine 1, negative pressure in brake booster 8 is surely secured in the early stage even in a highland.

In addition, in the above embodiment, although the intake pressure is controlled by controlling the opening degree of throttle valve 19, a bypass passage for bypassing throttle valve 19 and a bypass control valve for variably controlling the flow rate in the bypass passage are provided, and the control of the intake air amount for promoting the warm-up of the catalyst may be carried out by controlling the bypass control valve.

Or the intake pressure may be directly controlled by using, for example, a mechanical type supercharger.

The invention claimed is:

1. A method for controlling an internal combustion engine, wherein the internal combustion engine includes a catalyst converter for purifying exhaust gas and a brake booster to which negative pressure is supplied from a downstream of a throttle valve, the method comprising, at a time of an idle operation in which warm-up of the catalyst converter needs to be promoted:
    detecting an atmospheric pressure;
    comparing the detected atmospheric pressure with a predetermined atmospheric pressure threshold;
    controlling an intake pressure to a first target intake pressure obtained by adding an amount equivalent to a reduction amount of thermal efficiency, which is required to promote the warm-up of the catalyst converter, to an intake pressure required to maintain a predetermined idle speed, when the atmospheric pressure is higher than the atmospheric pressure threshold; and
    controlling the intake pressure to a second target intake pressure that is a highest intake pressure in a range in which a differential pressure required by the brake booster is obtained, when the atmospheric pressure is lower than the atmospheric pressure threshold,
    wherein the atmospheric pressure threshold is set to an atmospheric pressure at an altitude at which the first target intake pressure, which varies according to the altitude, and the second target intake pressure match each other.

2. The method for controlling the internal combustion engine according to claim 1, wherein, at the time of the idle operation in which the warm-up of the catalyst converter needs to be promoted, ignition timing retard is carried out.

3. The method for controlling the internal combustion engine according to claim 1, wherein the first target intake pressure has a characteristic tendency in which the lower the atmospheric pressure becomes, the lower the first target intake pressure becomes.

4. The method for controlling the internal combustion engine according to claim 1, wherein the control of the intake pressure is carried out by controlling an opening degree of the throttle valve.

5. A device for controlling an internal combustion engine, comprising:
    a catalyst converter for purifying exhaust gas;
    a brake booster to which negative pressure is supplied from a downstream of a throttle valve;
    a catalyst temperature sensor for detecting a warm-up state of the catalyst converter;
    a crank angle sensor for detecting whether or not the internal combustion engine is in an idle operation state;
    an atmospheric pressure sensor for detecting an atmospheric pressure; and
    an engine controller, wherein the engine controller is configured to
        compare the detected atmospheric pressure with a predetermined atmospheric pressure threshold, and
        at a time of the idle operation in which warm-up of the catalyst converter needs to be promoted, control a throttle valve opening degree to an opening degree so as to obtain a first target intake pressure obtained by adding an amount equivalent to a reduction amount of thermal efficiency, which is required to promote the warm-up of the catalyst converter, to an intake pressure required to maintain a predetermined idle speed, when the atmospheric pressure is higher than the atmospheric pressure threshold, and control the throttle valve opening degree to an opening degree so as to obtain a second target intake pressure that is a highest intake pressure in a range in which a differential pressure required by the brake booster is obtained, when the atmospheric pressure is lower than the atmospheric pressure threshold,
    wherein the atmospheric pressure threshold is set to an atmospheric pressure at an altitude at which the first target intake pressure, which varies according to the altitude, and the second target intake pressure match each other.

* * * * *